(12) United States Patent
Lin (10) Patent No.: US 7,001,509 B1
(45) Date of Patent: Feb. 21, 2006

(54) AQUARIUM FILTER HAVING SELF-PRIMING ARRANGEMENT

(76) Inventor: Chi-Hung Lin, 109-1.Lane 4 Fu Kuang. Wu Kuang Rd.. Wu Jih Hsiang., Taichung Hsien (TW)

( * ) Notice: Subject to any disclaimer, the term of this patent is extended or adjusted under 35 U.S.C. 154(b) by 0 days.

(21) Appl. No.: 10/938,344

(22) Filed: Sep. 9, 2004

(51) Int. Cl.
*A01K 63/04* (2006.01)

(52) U.S. Cl. .................. 210/169; 210/416.2; 210/418; 119/259

(58) Field of Classification Search ............... 210/169, 210/416.1, 416.2, 418; 119/259
See application file for complete search history.

(56) References Cited

U.S. PATENT DOCUMENTS

| | | | |
|---|---|---|---|
| 3,744,635 A | * | 7/1973 | Horvath ...................... 210/269 |
| 4,285,813 A | * | 8/1981 | Stewart et al. .............. 210/169 |
| 4,761,227 A | * | 8/1988 | Willinger et al. ........... 210/169 |
| 5,449,454 A | * | 9/1995 | Hickok ........................ 210/188 |
| 5,728,293 A | * | 3/1998 | Guoli et al. ................. 210/151 |
| 6,106,709 A | * | 8/2000 | Bresolin ...................... 210/169 |

FOREIGN PATENT DOCUMENTS

JP  9-287559  * 11/1997

* cited by examiner

*Primary Examiner*—Fred G. Prince (57) ABSTRACT

An external aquarium filter comprises a flow resistive, porous member disposed between a partition wall and the filter housing. Responsive to stopping the pump, water in the intake chamber begins to reversely flow out of the intake chamber into the aquarium tank through the intake tube due to siphoning, water in the filtering chamber flows back to the intake chamber through the porous member, the reverse flow is faster than water flowing into the intake chamber such that the siphoning breaks when the water level of the intake chamber drops below that of the filtering chamber, the water in the filtering chamber continues to flow back to the intake chamber through the porous member until both the filtering chamber and the intake chamber have the same water level, and sufficient priming water is thus stored in the intake chamber for a future restarting of the filter.

4 Claims, 14 Drawing Sheets

AQUARIUM FILTER HAVING SELF-PRIMING ARRANGEMENT

FIELD OF THE INVENTION

The present invention relates to aquarium filters and more particularly to an improved aquarium filter having a self-priming arrangement so as to restart the filter after the filter stops due to halting of the pump.

BACKGROUND OF THE INVENTION

Figure 1A:
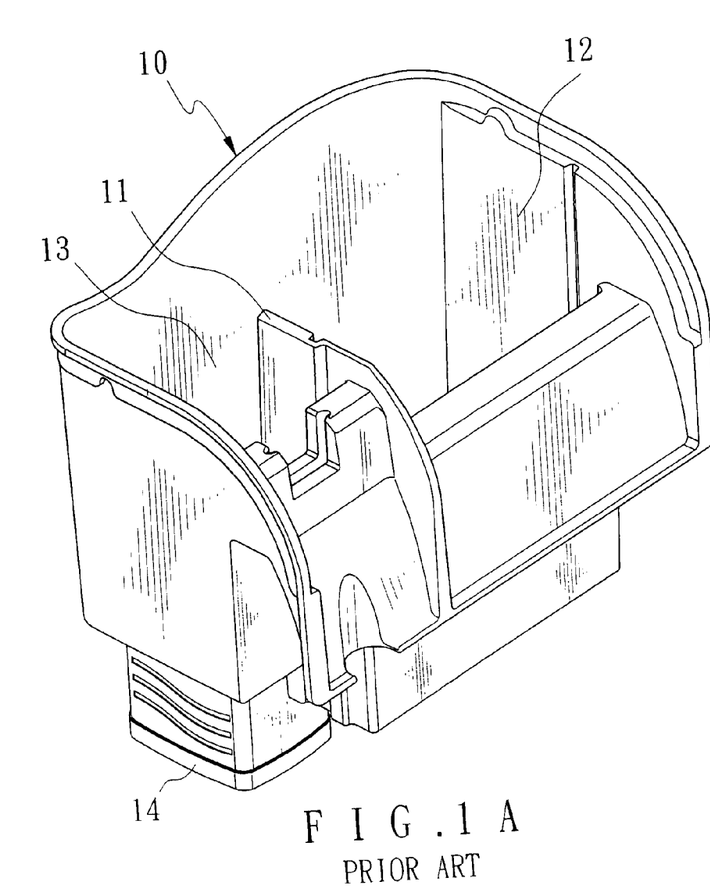
FIG. 1A is a perspective view of a well known aquarium filter.
Figure 1B:
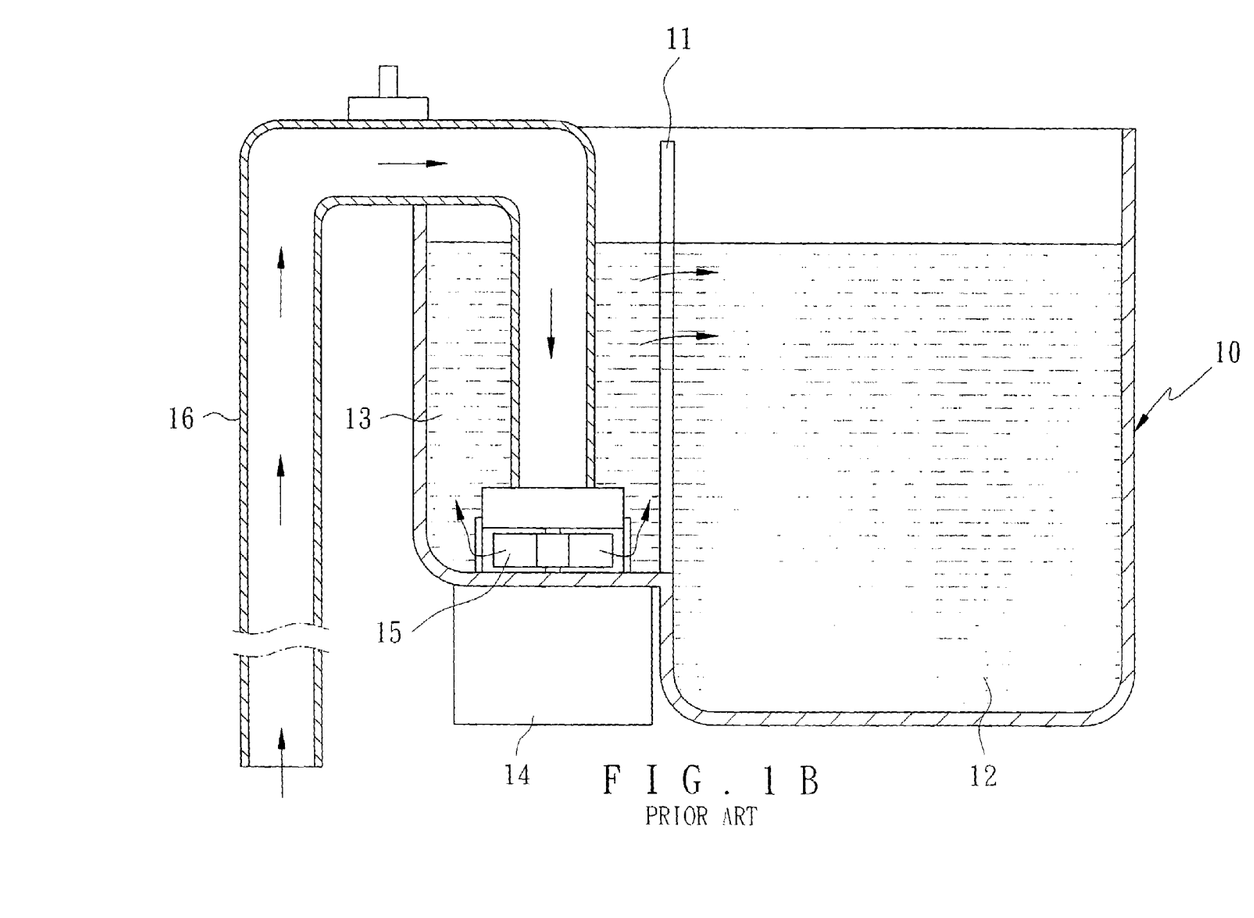
FIG. 1B shows the normal flow of the aquarium water through the well known filter.

Referring to FIGS. 1A and 1B, it shows the normal flow of aquarium water through a conventional filter. As illustrated, the filter housing 10 comprises an intake chamber 13 and a filtering chamber 12 which are separated by a partition wall 11. A pump 14 is provided under the intake chamber 13. An impeller 15 is disposed in the intake chamber 13 and is rotatably coupled to the pump 14. A U-shaped intake tube 16 has one end positioned in an aquarium tank (not shown) and the other end proximate the impeller 15. Upon energizing the pump 14 and thus the impeller 15, water from the aquarium tank is sucked into the intake tube 16. Water then flows up through the intake tube 16 and is drawn into the intake chamber 13. The water filled in the intake chamber 13 will overflow the partition wall 11 into the filtering chamber 12 if it has a sufficient height. The filtration material provided in the filtering chamber 12 is used to filter the water. The filtered water then passes back into the aquarium tank.

Figure 1C:
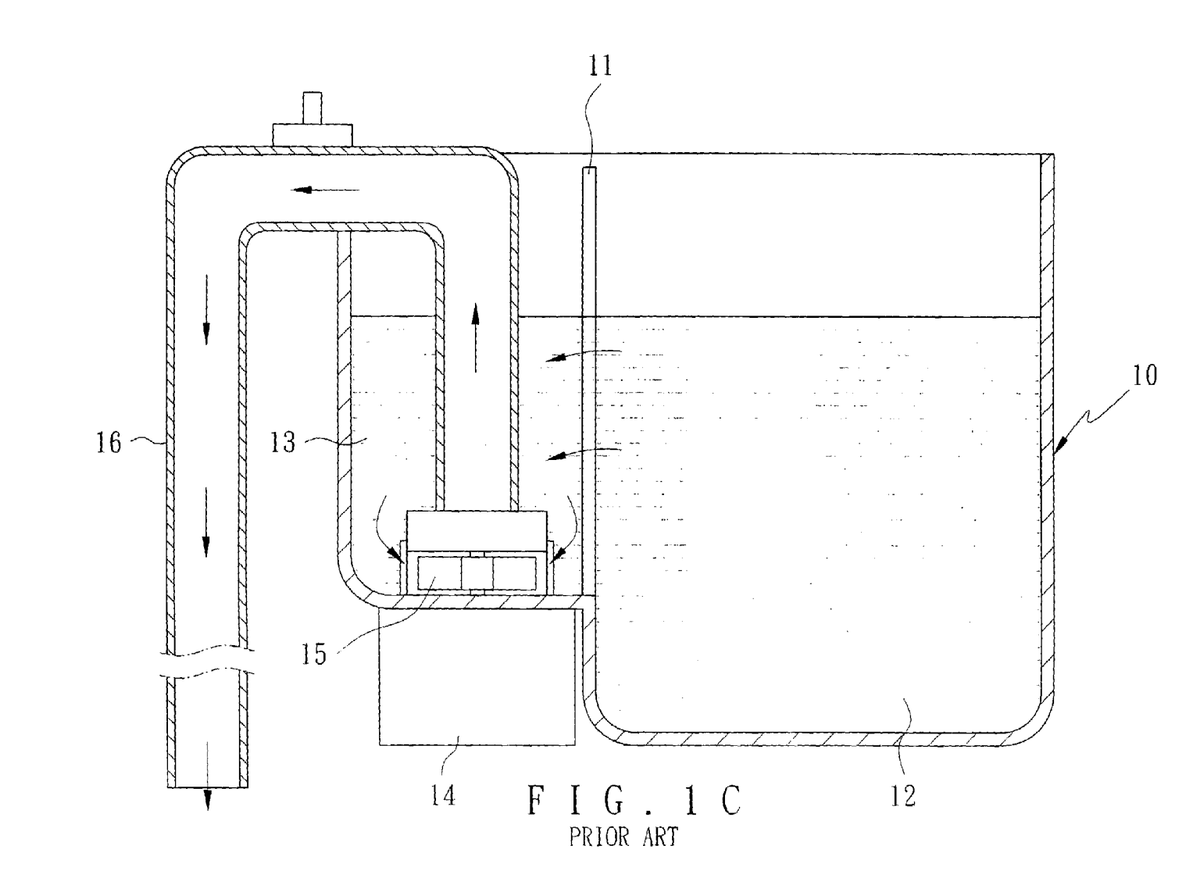
FIG. 1C shows a reversal of water flow due to a siphoning action when power to the pump is stopped so that the pump is no longer operating.

Referring to FIG. 1C, it is assumed that power outage has occurred or the impeller 15 failed to operate normally due to a piece of debris getting stuck therein. When such stoppage occurs, water in the intake chamber 13 begins to reversely flow out of the intake chamber 13 due to a siphoning action since the filter is provided at a level higher than the external aquarium tank. At the same time, water in the filtering chamber 12 flows backward over the partition wall 11 for filling the intake chamber 13 prior to flowing back to the aquarium tank through the intake tube 16.

Figure 1D:
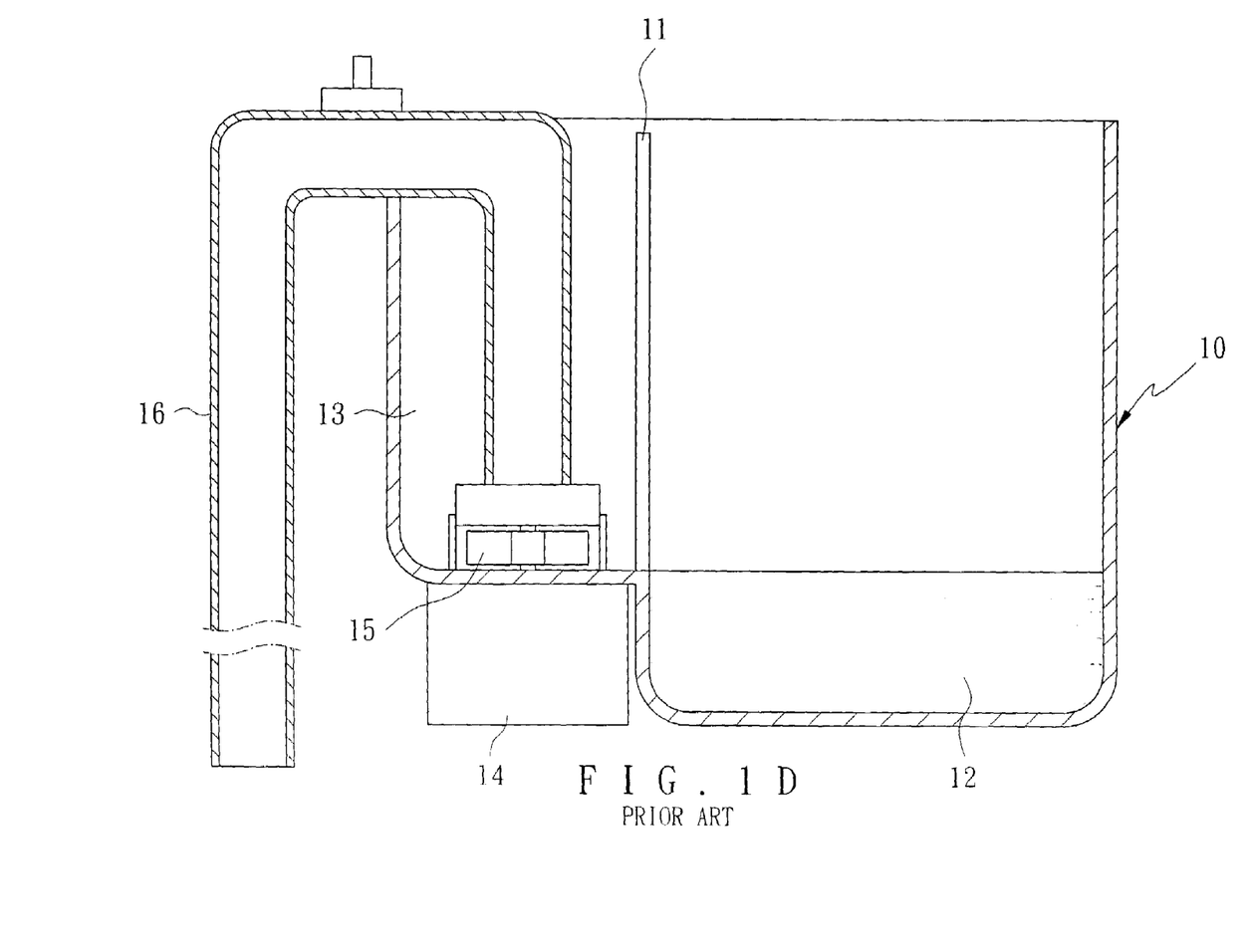
FIG. 1D shows draining of the intake chamber that occurs with the well known filter due to the siphoning action.

Referring to FIG. 1D, water in the intake chamber 13 is completely drained after water has gradually flowed back into the aquarium tank through the intake tube 16 and the water level of the filtering chamber 12 is no more higher than that of the intake chamber 13. At this time, the siphoning action stops. If the power to the pump 14 resumes, the filter will not begin but will remain in the stage shown in FIG. 1D. In order for the filter to begin, it must be primed whereby sufficient water is placed in the intake chamber 13 to cover the impeller 15 so that the impeller 15 will be able to spread water out and cause a reduced pressure thereby sucking in additional water. In the absence of such priming water, the filter will not restart and will remain in the state shown in FIG. 1D. However, since the electricity will begin flowing to the pump 14, the pump 14 will heat up. Since there is no circulating water in the pump 14, the pump 14 will continue to generate heat. This heat may cause damage to the intake chamber 13. Moreover, the failure of the filter to provide adequate filtration to the aquarium tank may cause damage and harm to the contents of the aquarium itself.

Figure 2A:
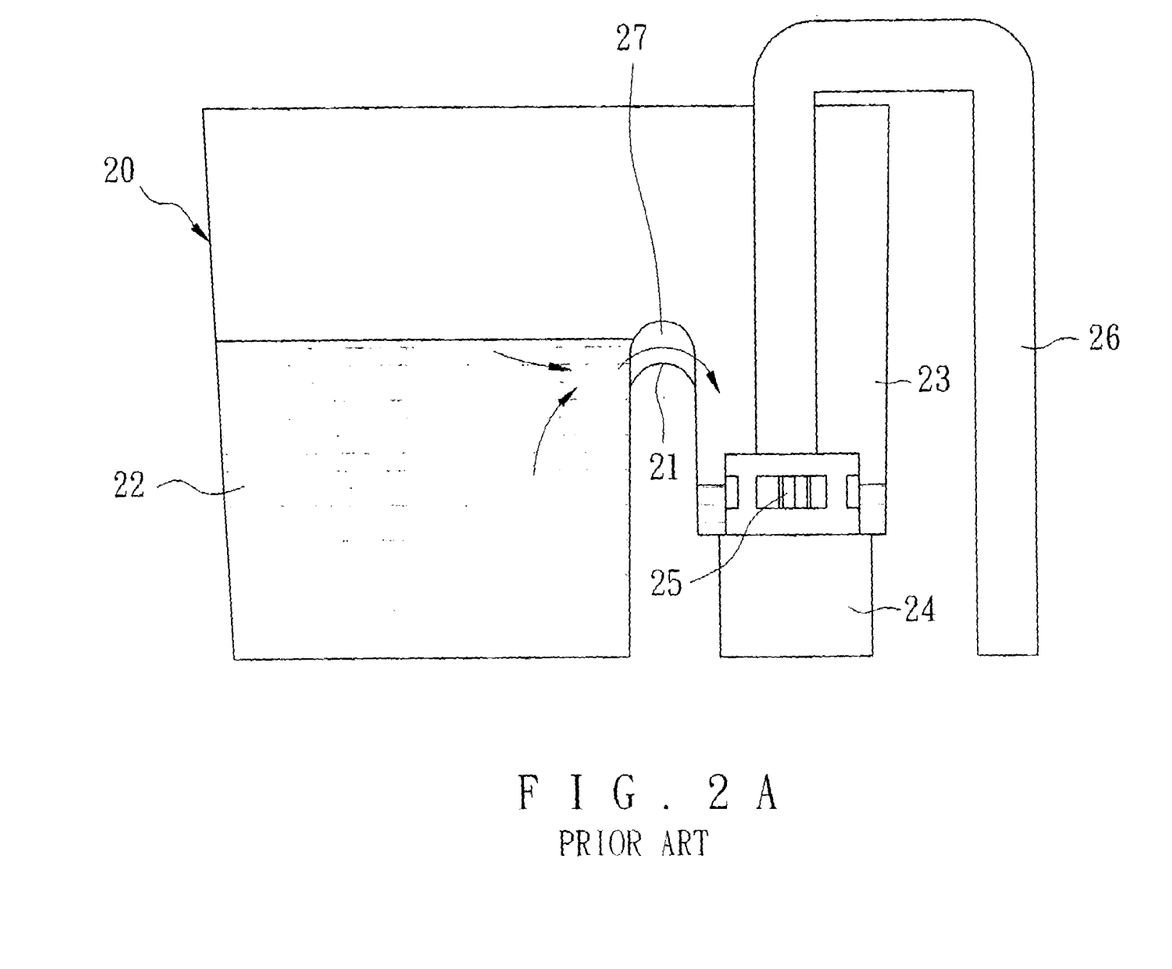
FIG. 2A shows the presence of the passageway in the partition wall which permits a continued trickle flow back from the filtering chamber to the intake chamber as disclosed in U.S. Pat. No. 4,761,227.
Figure 2B:
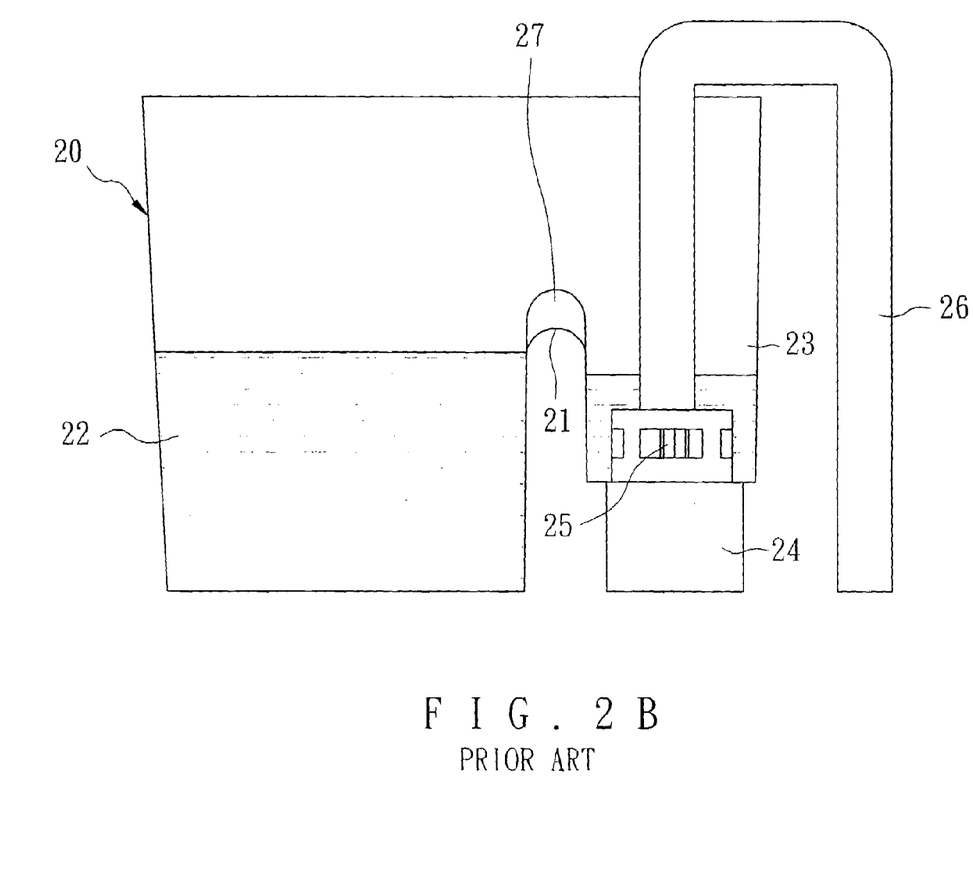
FIG. 2B shows the resultant water retained in the intake chamber for self-priming of the filter for restarting of the filter operation according to the patent shown in FIG. 2A.

U.S. Pat. No. 4,761,227 discloses a self priming aquarium filter for overcoming the above drawback as illustrated in FIGS. 2A and 2B. A narrow passageway 27 is provided in the partition wall 21. The cross-sectional area of the passageway 27 is less than that of the intake tube 26. Accordingly, after the majority of water has flowed over the partition wall 21 (see FIG. 2B), and when water level of the filtering chamber 22 has reached the upper end of the partition wall 21, a small trickle flow will still flow through the passageway 27 from the filtering chamber 22 back into the intake chamber 23. But the siphoning action of the intake tube 26 with respect to the intake chamber 23 will operate faster than the trickle flow. Hence, the siphoning flow will cause the water to drain out of the intake chamber 23 faster than the trickle flow flows into the intake chamber 23. As an end, the water will deplete from the intake chamber 23 beneath the level of the impeller 25. Thereafter, the siphon breaks and no more water will flow outwardly from the intake chamber 23. When this occurs, the continuous trickle flow passing through the passageway 27 will now begin accumulating in the intake chamber 23. As a result, the intake chamber 23 is filled with sufficient priming water. Upon resumption of power, the filter and thus the impeller 25 will automatically start a normal operation without adding priming water manually. The patent aids in permitting the siphoning action to break prior to providing a sufficient trickle flow to reprime the filter.

Figure 3A:
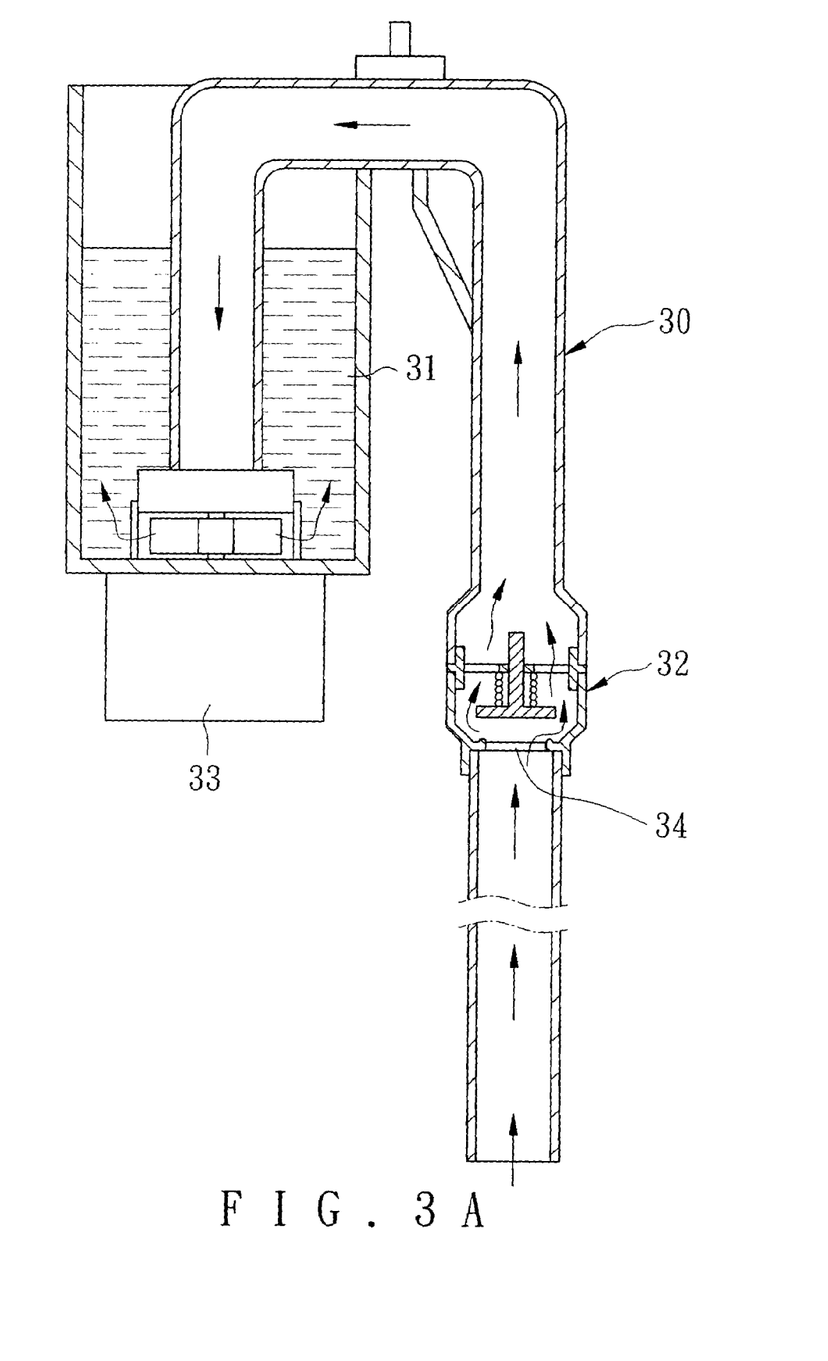
FIG. 3A is a sectional view showing the provision of a check valve in an intake tube according to Taiwanese Patent Application No. 93,112,070, where water normally flows through the intake tube.
Figure 3B:
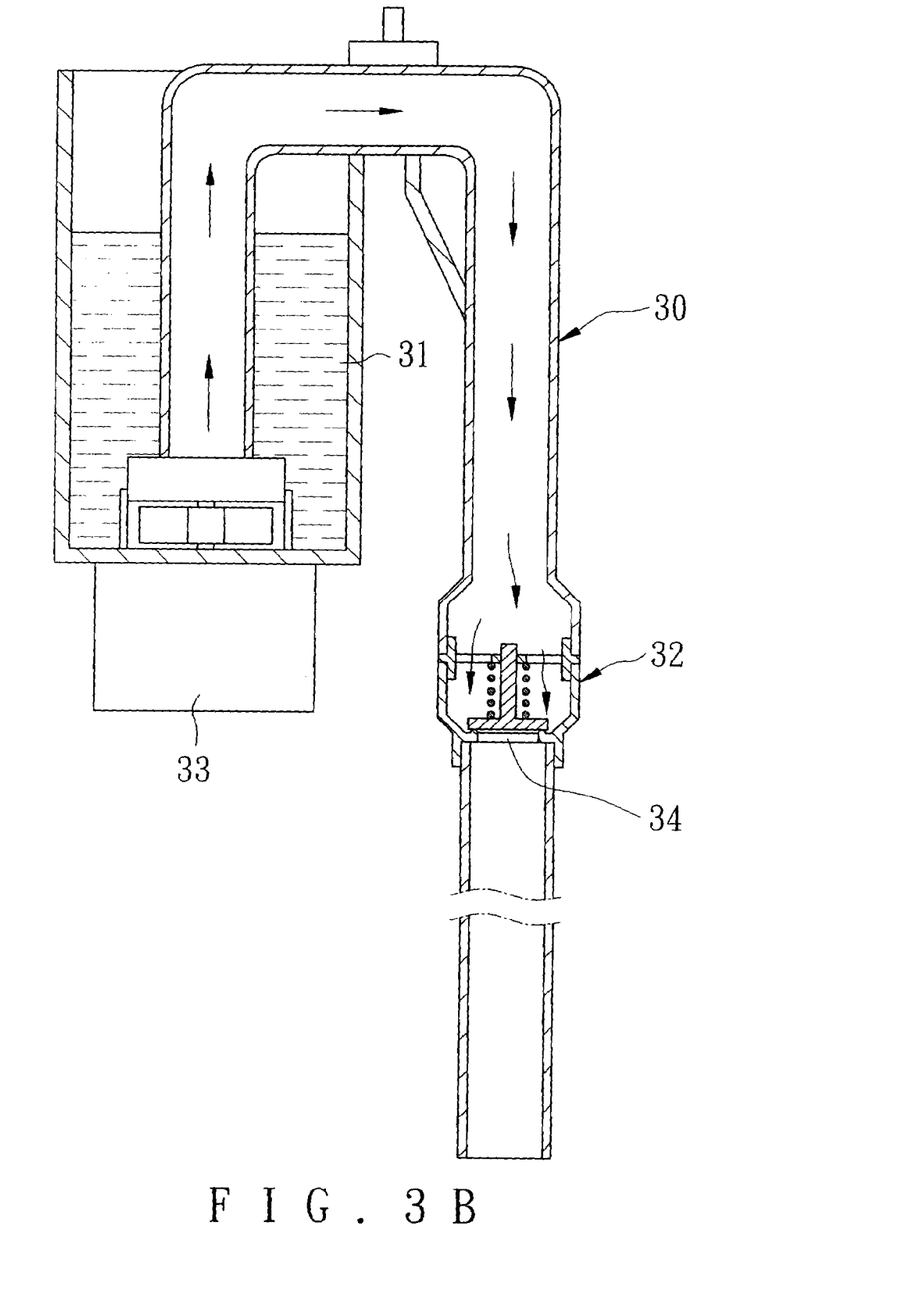
FIG. 3B is a view similar to FIG. 3A, where a trickle flow is stopped by the closed check valve when the pump is deenergized.

Taiwanese Patent Application No. 93,112,070, entitled "Aquarium Filter Having Check Valve", as invented by the present inventor is shown in FIGS. 3A and 3B. A check valve 32 is provided in a vertical portion of the intake tube 30. In operation (i.e., the pump 33 is energized) as shown in FIG. 3A, water flows from the aquarium tank to the intake chamber 31 via the intake tube 30 and the check valve 32. In an inoperative state of the filter (i.e., the pump 33 is deenergized) as shown in FIG. 3B, the inlet 34 of the check valve 32 is completely blocked due to its spring mechanism. As such, a small trickle flow due to the siphoning action of the intake tube 30 will not flow through the check valve 32. As a result, sufficient water is placed in the intake chamber 31 for ensuring a self-priming of the filter when power resumes. While it is advantageous in the self-priming arrangement, the provision of the check valve 32 can increase the difficulty of assembly, the complexity of parts, and cost. Thus, the need for improvement still exists.

SUMMARY OF THE INVENTION

It is an object of the present invention to provide an aquarium filter for mounting externally of an aquarium tank comprising an intake chamber for receiving contaminated water from the aquarium tank; a filtering chamber in flow communication with the intake chamber, the filtering chamber including a filtration member for filtering the contaminated water to return clean water back to the aquarium tank; a partition wall disposed between the intake chamber and the filtering chamber for overflowing water from the intake chamber into the filtering chamber; an intake tube for supplying water from the aquarium tank to the intake chamber; a flow resistive, porous member disposed between the partition wall and an inner wall of the aquarium filter; and pump means having an impeller for drawing water from the aquarium filter into the intake chamber through the intake tube, wherein responsive to stopping the pump means, water in the intake chamber begins to reversely flow out of the intake chamber into the aquarium tank through the intake tube due to a siphoning action, water in the filtering chamber flows back to the intake chamber through the porous member and over the porous member if a water level of the filtering chamber is higher than that of the intake chamber, the reverse flow is faster than the water flowing into the intake chamber such that the siphoning action breaks when the water level of the intake chamber drops below that of the filtering chamber by a predetermined distance with the impeller being exposed, the water in the filtering chamber continues to flow back to the intake chamber through the porous member until the water level of the filtering chamber is equal to that of the intake chamber, and at this time a sufficient amount of water is stored in the intake chamber as priming water for a future restarting of the aquarium filter.

The above and other objects, features and advantages of the present invention will become apparent from the following detailed description taken with the accompanying drawings.

DETAILED DESCRIPTION OF THE PREFERRED EMBODIMENTS

Figure 4:
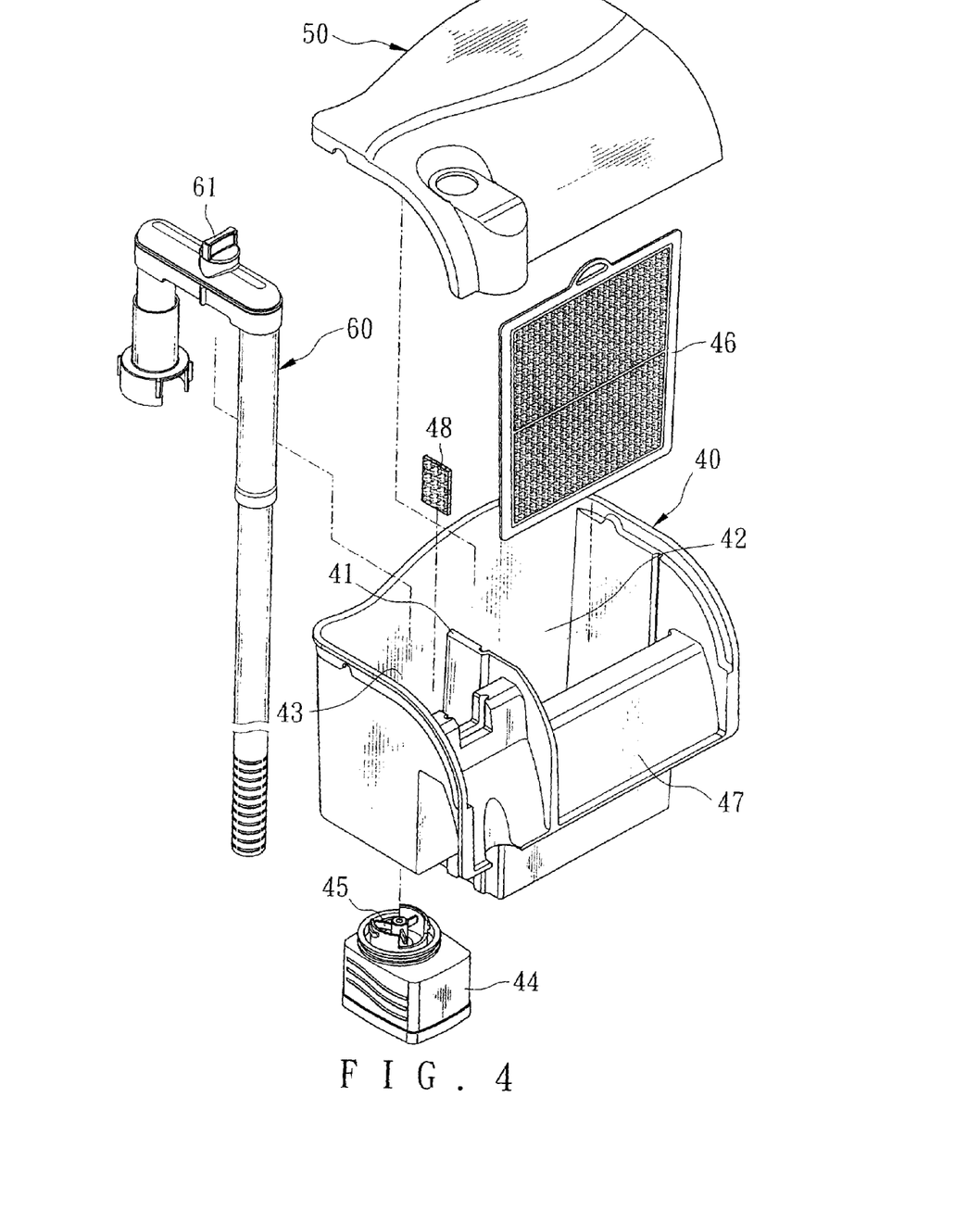
FIG. 4 is an exploded view of a preferred embodiment of aquarium filter according to the invention.
Figure 5:
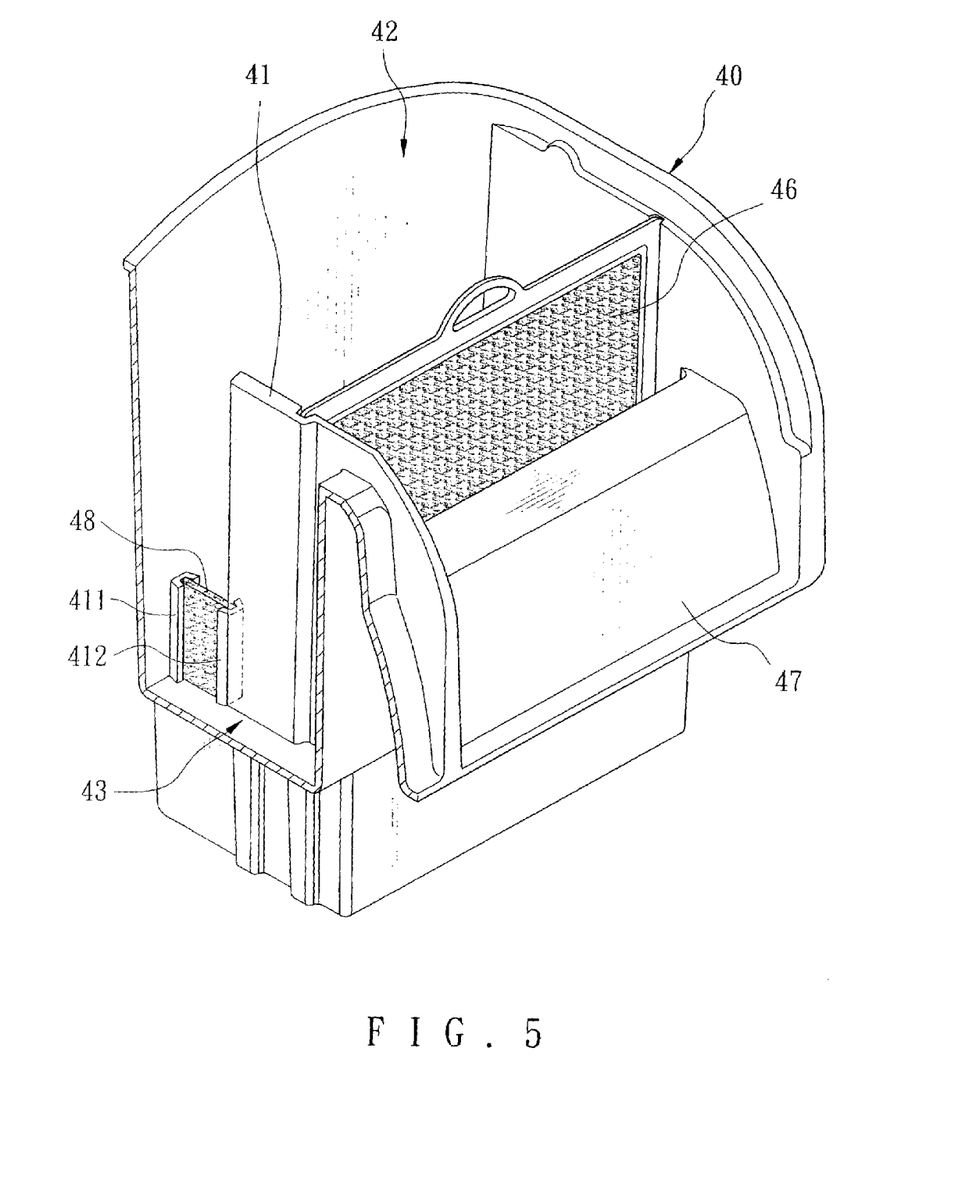
FIG. 5 is a perspective view of a portion of the assembled aquarium filter shown in FIG. 4.

Referring to FIGS. 4 and 5, there is shown an external aquarium filter constructed in accordance with the invention. The filter comprises a filter housing 40 having an internal space divided into an intake chamber 43 and a filtering chamber 42 by a partition wall 41, and a removable cover 50 snugly fitted onto a peripheral lip on a top of the filter housing 40. A pump 44 is provided under the intake chamber 43. An impeller 45 is disposed in the intake chamber 43 and is rotatably coupled to the pump 44. A filter cartridge 46 is vertically, removably mounted in the filtering chamber 42. A spillway 47 is extended obliquely downwardly from a top edge of the filtering chamber 42 such that the aquarium filter is adapted to mount externally of an aquarium tank (not shown) by hanging the spillway 47 thereon. An L-shaped intake tube 60 is held on a top notch of the frame of the intake chamber 43 and has one end positioned in the aquarium tank and the other end proximate the impeller 45. A flow-control valve 61 is provided in a horizontal section of the intake tube 60. Moreover, two opposite vertical guide grooves 411 and 412 are disposed between the intake chamber 43 and the filtering chamber 42 in which one guide groove 411 is formed on an inner wall of the filter housing 40 and the other guide groove 412 is formed with the partition wall 41. A rectangular porous member (e.g., sponge) 48 is slid into and between the guide grooves 411 and 412 for positioning. The provision of the porous member 48 aims at decreasing water flowing from the intake chamber 43 into the filtering chamber 42 (i.e., increased flow resistance) as compared with water flowed into the intake chamber 43 from the intake tube 60.

Figure 6:
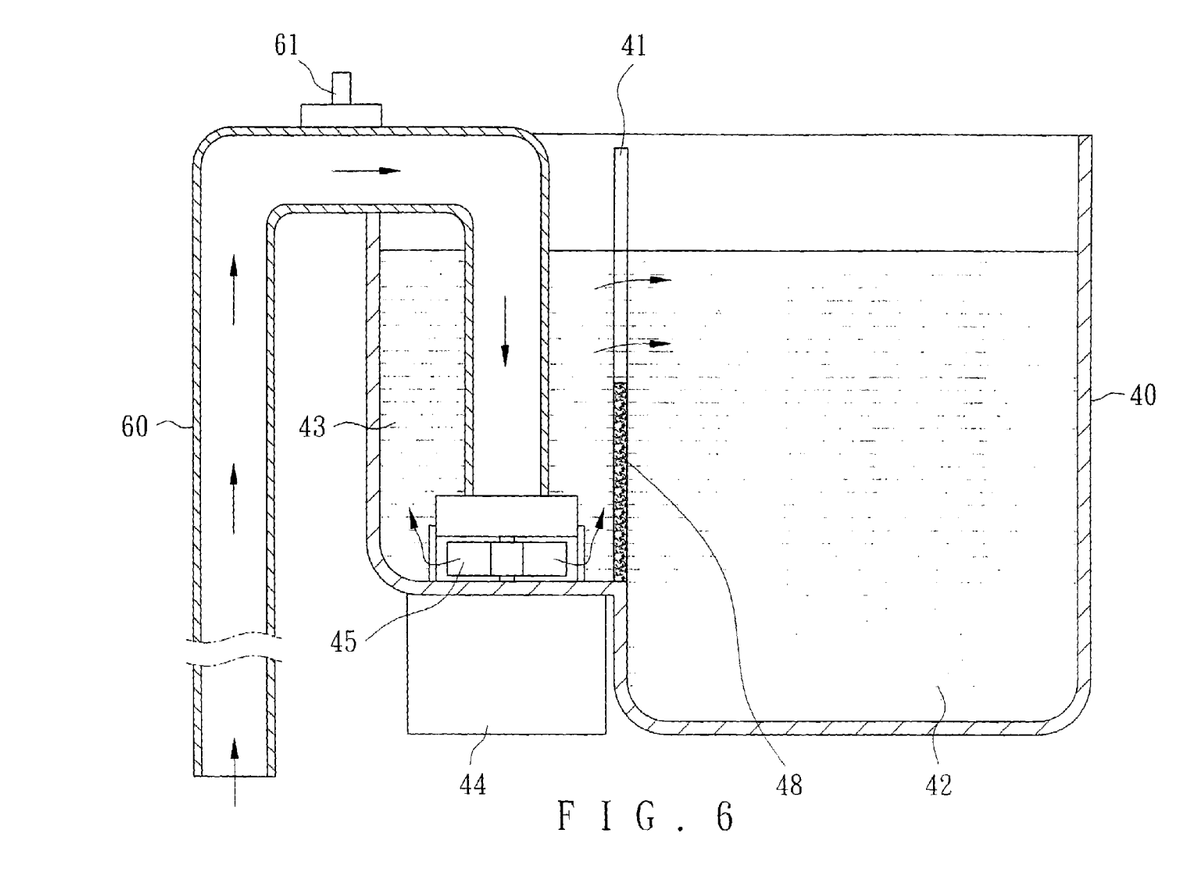
FIG. 6 is a schematic sectional view depicting a normal filtering operation of the aquarium filter according to the invention.

Referring to FIG. 6, upon energizing the pump 24, water will be drawn from the aquarium tank into the intake chamber 43 through the intake tube 60. The water in the intake chamber 43 will overflow the porous member 48 into the filtering chamber 42 if it has a sufficient height. The filtration material of the filter cartridge 46 is used to filter the water in the filtering chamber 42. The filtered water then passes back into the aquarium tank through the spillway 47.

Figure 7:
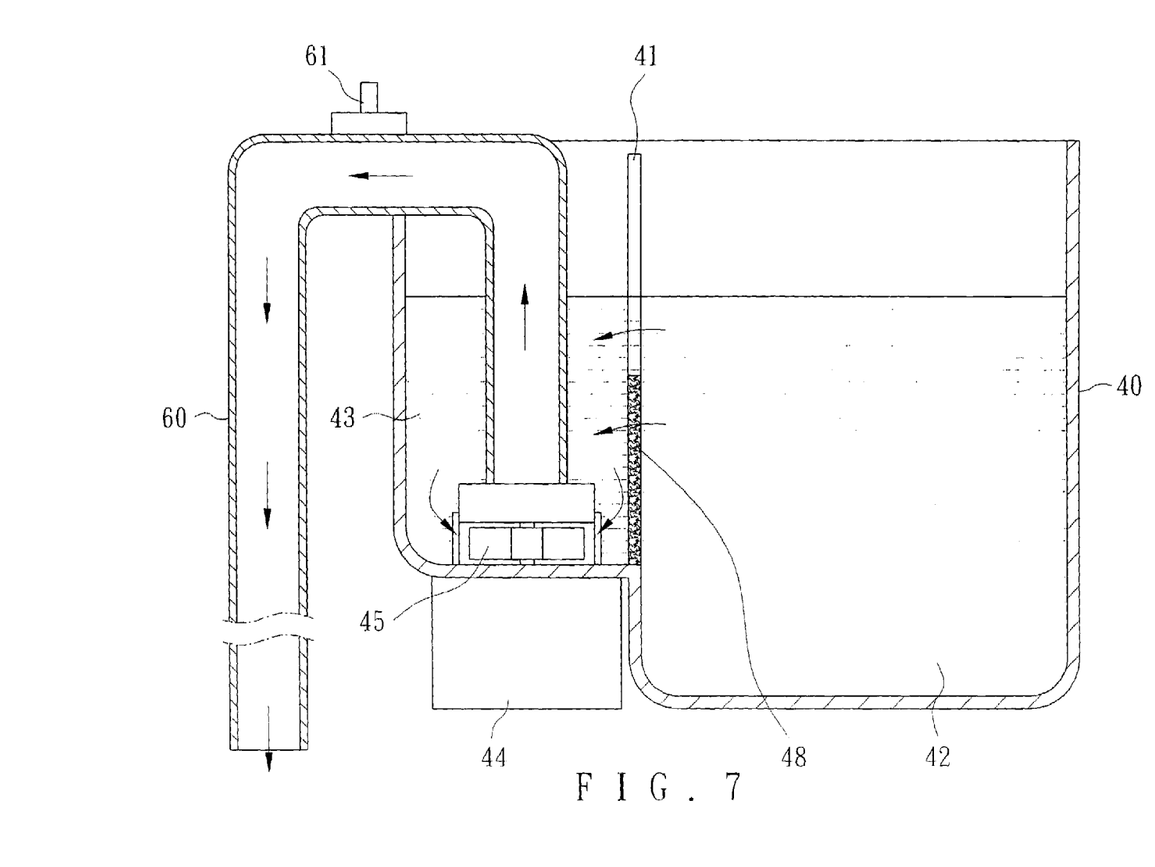
FIGS. 7, 8, and 9 are views similar to FIG. 6 for illustrating water flow in the aquarium filter when the pump is deenergized.

Referring to FIG. 7, if the pump 44 stops due to power outage, water in the intake chamber 43 begins to reversely flow out of the intake chamber 43 into the aquarium tank through the intake tube 60 due to a siphoning action in the intake tube 60. Also, water in the filtering chamber 42 flows back to the intake chamber 43 over the porous member 48 and through the porous member 48.

Figure 8:
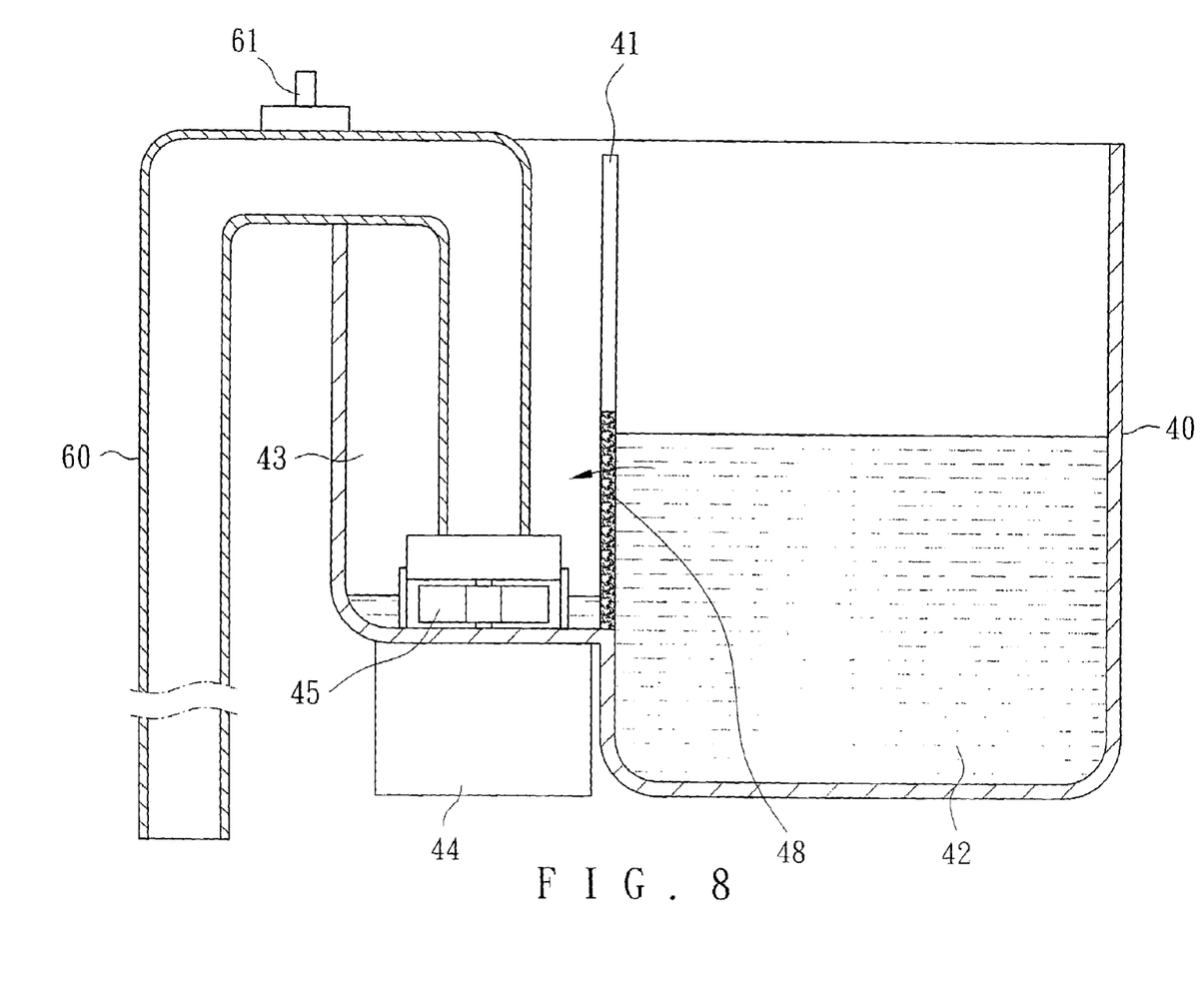

Referring to FIG. 8, once the water level of the filtering chamber 42 falls below the top edge of the porous member 48 flow rate of water flowing back to the intake chamber 43 from the filtering chamber 42 will decrease because, as stated above, water passes the porous member 48. As such, water drawn out of the intake chamber 43 is more than water flowing into the intake chamber 43. As such, air is drawn into the intake tube 60. As a result, the siphoning action breaks (i.e., water is blocked from flowing back to the aquarium tank). At this time, the water level of the intake chamber 43 is lower than that of the filtering chamber 42.

Figure 9:
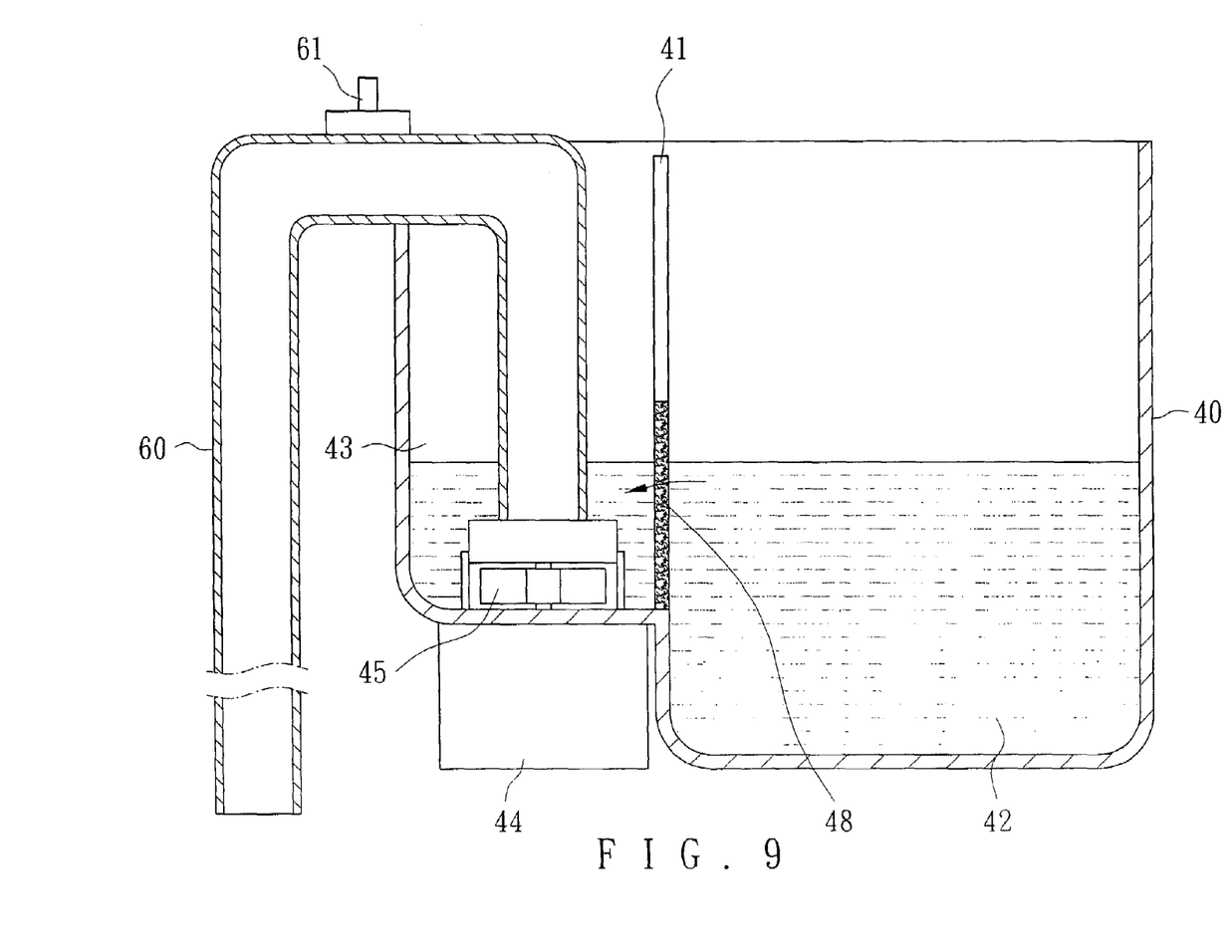

Referring to FIG. 9, while the water is blocked from flowing back to the aquarium tank, water in the filtering chamber 42 continues to flow back to the intake chamber 43 through the porous member 48 until the water level of the filtering chamber 42 is equal to that of the intake chamber 43. The water level of the intake chamber 43 is higher than a joining portion of the intake tube 60 and the impeller 45 (i.e., covered the impeller 45) when water in the filtering chamber 42 stops flowing back to the intake chamber 43. In other words, there is sufficient priming water stored in the intake chamber 43. Therefore, if the power to the pump 24 resumes, the filter will automatically begin to operate normally without adding priming water manually.

While the invention herein disclosed has been described by means of specific embodiments, numerous modifications and variations could be made thereto by those skilled in the art without departing from the scope and spirit of the invention set forth in the claims.

What is claimed is:

1. An aquarium filter for mounting externally of an aquarium tank, comprising:
   an intake chamber for receiving contaminated water from the aquarium tank;
   a filtering chamber in flow communication with the intake chamber, the filtering chamber including a filtration member for filtering the contaminated water to return clean water back to the aquarium tank;

a partition wall disposed between the intake chamber and the filtering chamber for overflowing water from the intake chamber into the filtering chamber;

an intake tube for supplying water from the aquarium tank to the intake chamber;

a flow resistive, porous member disposed between the partition wall and an inner wall of the aquarium filter; and pump means having an impeller for drawing water from the aquarium filter into the intake chamber through the intake tube, wherein responsive to stopping the pump means, water in the intake chamber begins to reversely flow out of the intake chamber into the aquarium tank through the intake tube due to a siphoning action, water in the filtering chamber flows back to the intake chamber through the porous member and over the porous member if a water level of the filtering chamber is higher than that of the intake chamber, the reverse flow is faster than the water flowing into the intake chamber such that the siphoning action breaks when the water level of the intake chamber drops below that of the filtering chamber by a predetermined distance with the impeller being exposed, the water in the filtering chamber continues to flow back to the intake chamber through the porous member until the water level of the filtering chamber is equal to that of the intake chamber, and at this time a sufficient amount of water is stored in the intake chamber as priming water for a future restarting of the aquarium filter.

2. The aquarium filter of claim 1, further comprising a first vertical guide groove formed on the inner wall of the aquarium filter and a second opposite, vertical guide groove formed with the partition wall, and wherein the porous member is slid into and between the guide grooves for positioning.

3. The aquarium filter of claim 1, wherein the porous member is a sponge.

4. The aquarium filter of claim 1, further comprising a flow-control valve disposed in a predetermined position of the intake tube.

* * * * *